United States Patent [19]

Paddock

[11] Patent Number: 5,336,027

[45] Date of Patent: Aug. 9, 1994

[54] VEHICLE FOR CARRYING COILED ROLLS

[76] Inventor: Martin Paddock, 44 Oceanic Drive, Stoney Creek, Ontario, Canada, L8E 4H5

[21] Appl. No.: 991,270

[22] Filed: Dec. 16, 1992

[30] Foreign Application Priority Data

Jul. 20, 1990 [CA] Canada .................. 2074240

[51] Int. Cl.⁵ .................. B60P 7/14; B60P 7/02; B60P 7/08
[52] U.S. Cl. .................. 410/49; 105/377 R
[58] Field of Search .................. 410/47, 48, 49, 50, 410/121, 122, 123, 153; 105/377

[56] References Cited

U.S. PATENT DOCUMENTS

| | | | |
|---|---|---|---|
| 3,009,426 | 11/1961 | Nampa .................. | 410/47 |
| 3,061,255 | 10/1962 | Gallo et al. .................. | 410/49 X |
| 3,291,073 | 12/1966 | James .................. | 410/49 |
| 3,387,813 | 6/1968 | Carino .................. | 410/50 |
| 3,392,682 | 7/1968 | Francis .................. | 410/49 X |
| 3,829,148 | 8/1974 | Stoneburner .................. | 410/49 |
| 3,913,969 | 10/1975 | Hoch .................. | 105/377 X |
| 3,922,004 | 11/1975 | Chamberlain .................. | 410/49 |
| 4,685,846 | 8/1987 | Golay et al. .................. | 410/49 |
| 5,170,717 | 12/1992 | Richmond et al. .................. | 105/377 |
| 5,211,518 | 5/1993 | Mimica .................. | 410/49 X |

FOREIGN PATENT DOCUMENTS

| | | | |
|---|---|---|---|
| 474497 | 6/1951 | Canada .................. | 105/377 |
| 2429715 | 1/1976 | Fed. Rep. of Germany .................. | 410/49 |
| 3514975 | 10/1986 | Fed. Rep. of Germany .................. | 410/49 |
| 3637127 | 8/1987 | Fed. Rep. of Germany .................. | 410/49 |
| 185893 | 10/1963 | Sweden .................. | 105/377 |

*Primary Examiner*—Michael S. Huppert
*Assistant Examiner*—Stephen Gordon
*Attorney, Agent, or Firm*—Bereskin & Parr

[57] ABSTRACT

A trailer assembly designed to transport rolls of rolled material, such as rolls of coiled steel. The assembly comprises a floor pan, one or more bunks, each of which comprises two opposed inclined members of a size and configuration to hold the roll off the floor pan, two laterally moveable side locks for each of the rolls, a lid enclosure which is hingedly moveable frontwardly or rearwardly between an open and a closed position, the lid when in the closed position forming a tight seal with the floor pan, and a stand for the lid when in the open position.

12 Claims, 5 Drawing Sheets

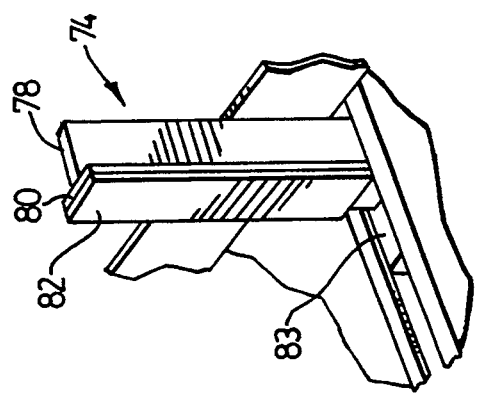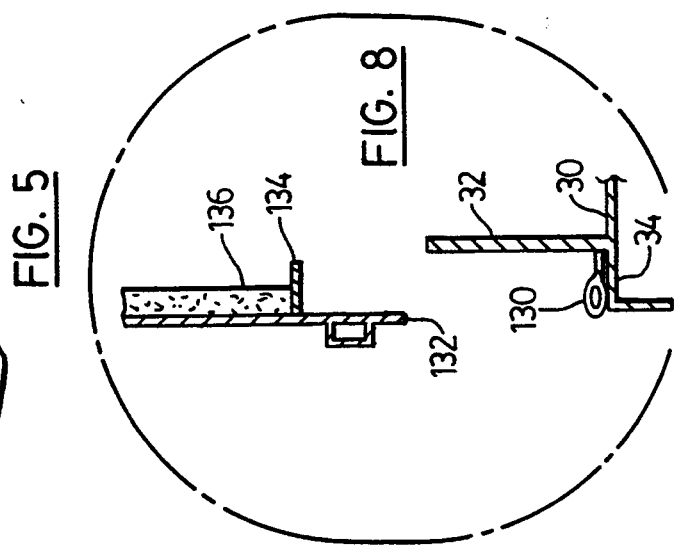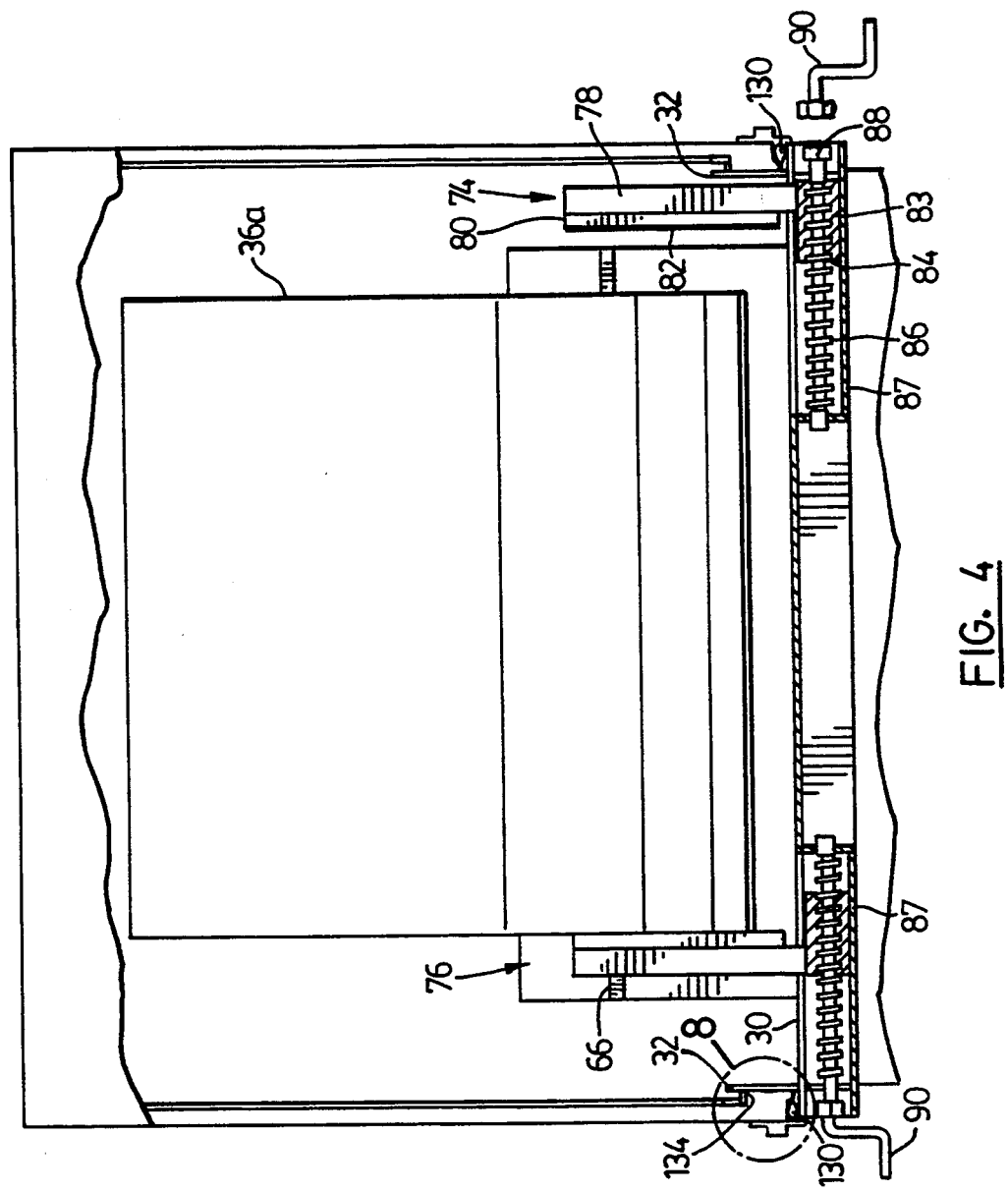

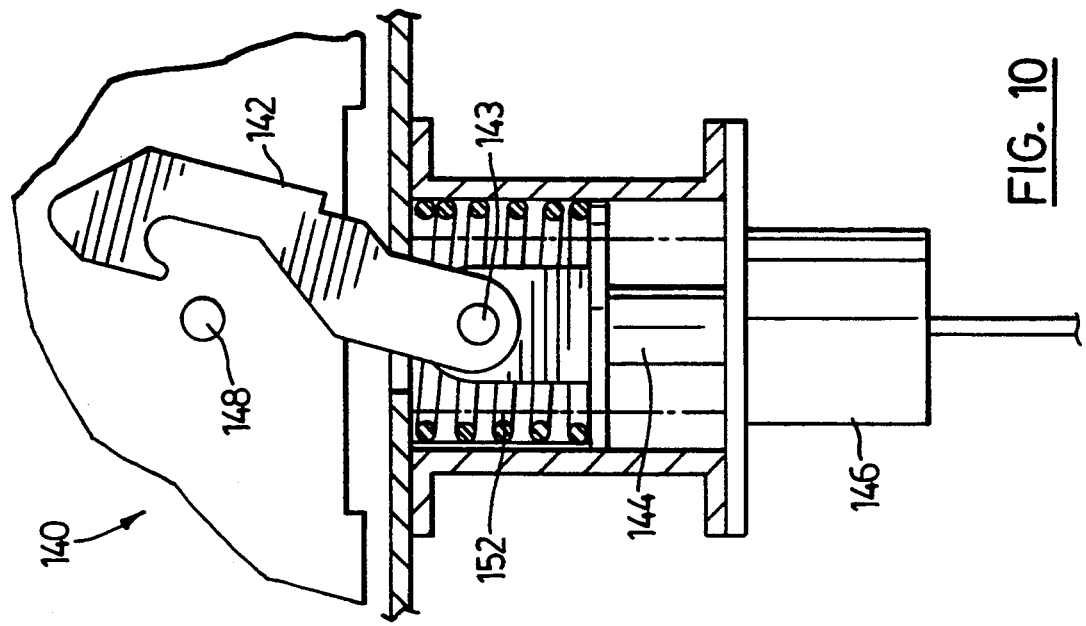
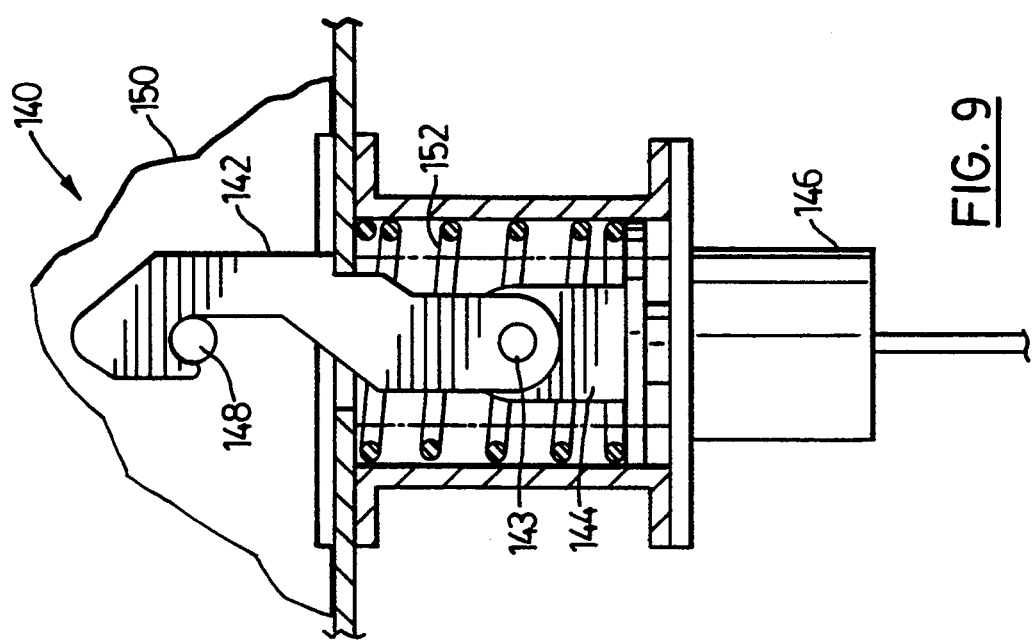

VEHICLE FOR CARRYING COILED ROLLS

FIELD OF THE INVENTION

This invention relates to a vehicle and more particularly to a vehicle designed for carrying rolls of rolled material, for example rolls of coiled steel.

BACKGROUND OF THE INVENTION

In the past, rolled material such as coils of steel has usually been transported on exposed trucks. In order to protect the surface of the steel, the coil is first wrapped in paper to prevent dirt and road spray from hitting the coil. The coil is then placed upright on a trailer and chained down.

This method of transporting coiled steel has several disadvantages. Firstly, there is the expense and time associated with the step of wrapping the coils in paper. Secondly, the paper is thrown out once used, resulting in both waste and increased costs. Thirdly, if the coils have a fragile surface, e.g. if they are steel which is ready to paint, then the handling involved in wrapping and unwrapping the coils can mar the surface. For example fingerprints on the surface of ready to paint steel will deposit oil which will prevent the paint from adhering. The coils being shipped are therefore easily rendered defective.

Accordingly, it is an object of the present invention to provide a vehicle for transporting rolls of coiled material, in which the rolls need not be wrapped and yet the likelihood of damage to the rolls is reduced.

SUMMARY OF THE INVENTION

In one aspect the present invention provides a wheeled vehicle adapted for travel forwardly and rearwardly along a path of travel and for carrying a roll of coiled material, said vehicle having:
(a) a floor pan,
(b) a bunk comprising two opposed inclined members, said inclined members sloping in opposite directions oriented substantially parallel to said path of travel to form a substantially V-shaped surface to support said roll, said members being inclined at angles for maintaining the bottom of said roll above said floor pan,
(c) two side locks, one at each side of said bunk, for restraining said roll against movement laterally of said path of travel, and means mounting each side lock for independent lateral movement towards and away from a roll in said bunk,
(d) a lid,
(e) hinge means mounting said lid for movement between a closed position in which said lid forms a tight seal with said floor pan to isolate a roll in said bunk from the exterior, and an open position in which a said roll can be placed in or removed from said bunk,
(f) motive means for moving said lid between said open and closed positions.

BRIEF DESCRIPTION OF THE DRAWINGS

The invention will be better understood with reference to the accompanying drawings in which:
FIG. 4 is a cross-sectional view on lines 4—4 of FIG. 3, showing details of side locks;
FIG. 5 is a perspective view of a portion of a side lock;
FIG. 6 is a perspective view showing a cylinder and piston connection to the rear wall of a lid;
FIG. 7 is a perspective view showing a stand;
FIG. 8 is a sectional view showing details of a lid sealing arrangement;
FIG. 9 is a cross-sectional view on lines 9—9 of FIG. 1 showing a detail of an enclosure latching mechanism in the closed position; and,
FIG. 10 is a cross-sectional view showing a detail of the latching mechanism of FIG. 9 in the open position.

DESCRIPTION OF THE PREFERRED EMBODIMENTS

Figure 1:
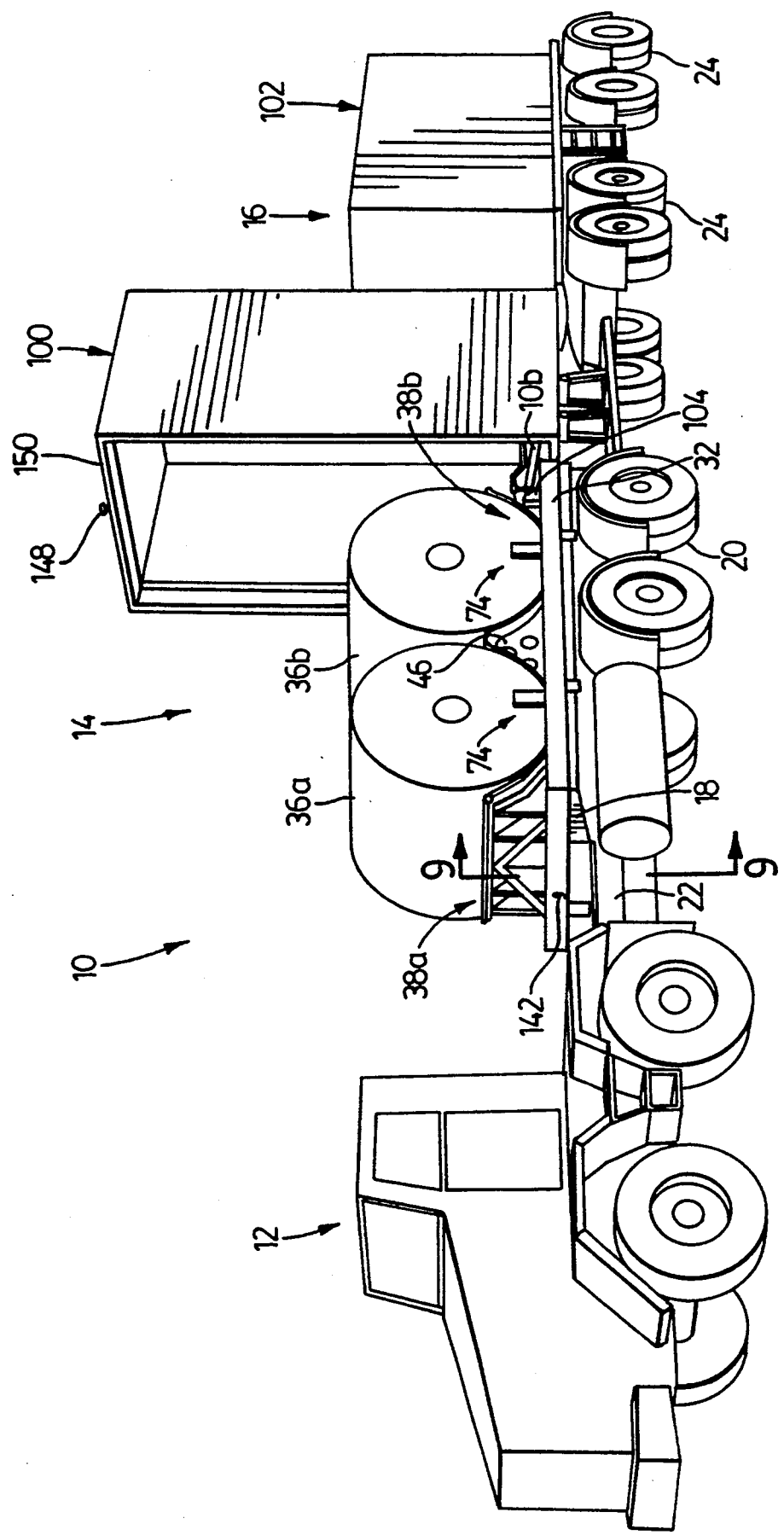
FIG. 1 is a perspective view of a combination of two trailers according to the present invention, one open and the other closed.

Reference is first made to FIG. 1, which shows a tractor and trailer combination 10 which includes a tractor 12, and first and second trailers 14, 16. In FIG. 1 trailer 14 is shown in an open condition, and trailer 16 is shown in a closed position. Trailers 14, 16 are the same except as will be noted, so that only trailer 14 will be described.

Trailer 14 includes a frame 18 supported at its rear by wheel and axle assemblies 20 and at its front by a conventional tongue or hitch assembly 22 which connects to the tractor 12. The rear trailer 16 includes two sets of wheel and axle assemblies 24, and an elongated tongue or hitch 26 pivotally connected to each of the trailers 14, 16.

Each trailer 14, 16 also includes a floor pan 30 (FIG. 3), and a raised lip 32 (typically 6 to 8 inches high) extending entirely around the perimeter of the floor pan 30. The floor pan 30 projects outwardly beyond each vertical lip 32 to form a horizontal outwardly projecting ledge 34 which also extends around the perimeter of the floor pan 30 of each trailer, for a purpose to be described.

Trailers 14, 16 are each designed to carry two large rolls 36a, 36b. The rolls 36a, 36b may typically be coiled materials such as thin sheet steel, the surface of which has been prepared to be ready to paint. As mentioned, the surface of such steel must be kept clean, since even a fingerprint on it will deposit oil which will prevent paint from adhering uniformly.

As shown, roll 36a rests on bunk 38a, and roll 36b rests on bunk 38b. Bunk 38a is formed by two angled support members or ramps 40a, 42a, while bunk 38b is formed by two similar angled support members or ramps 40b, 42b. As shown, the centrally located ramps 42a, 42b are combined into a single generally triangular structure 46 having an apex 48.

Figure 2:
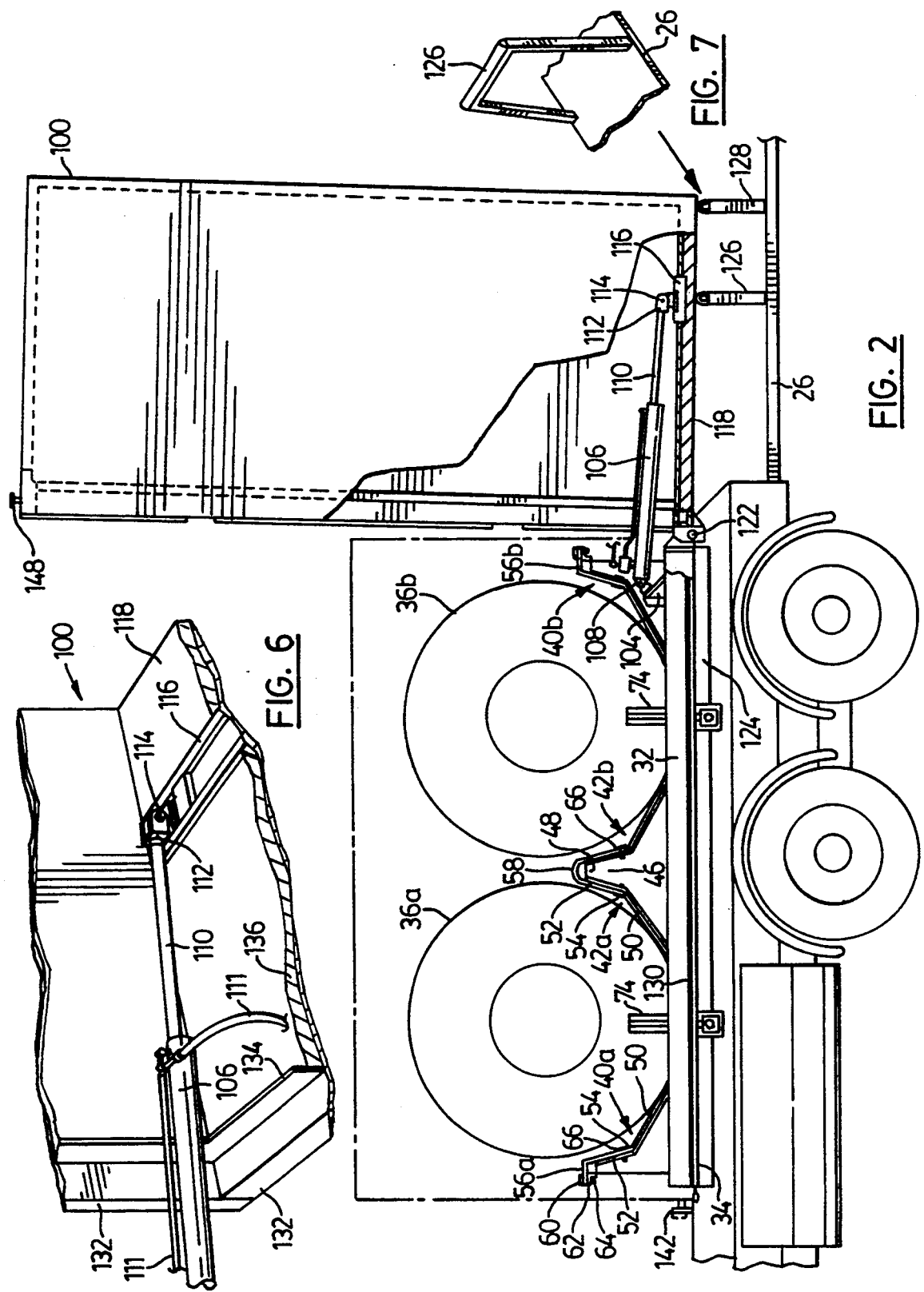
FIG. 2 is a side view of the open trailer of FIG. 1.
Figure 3:
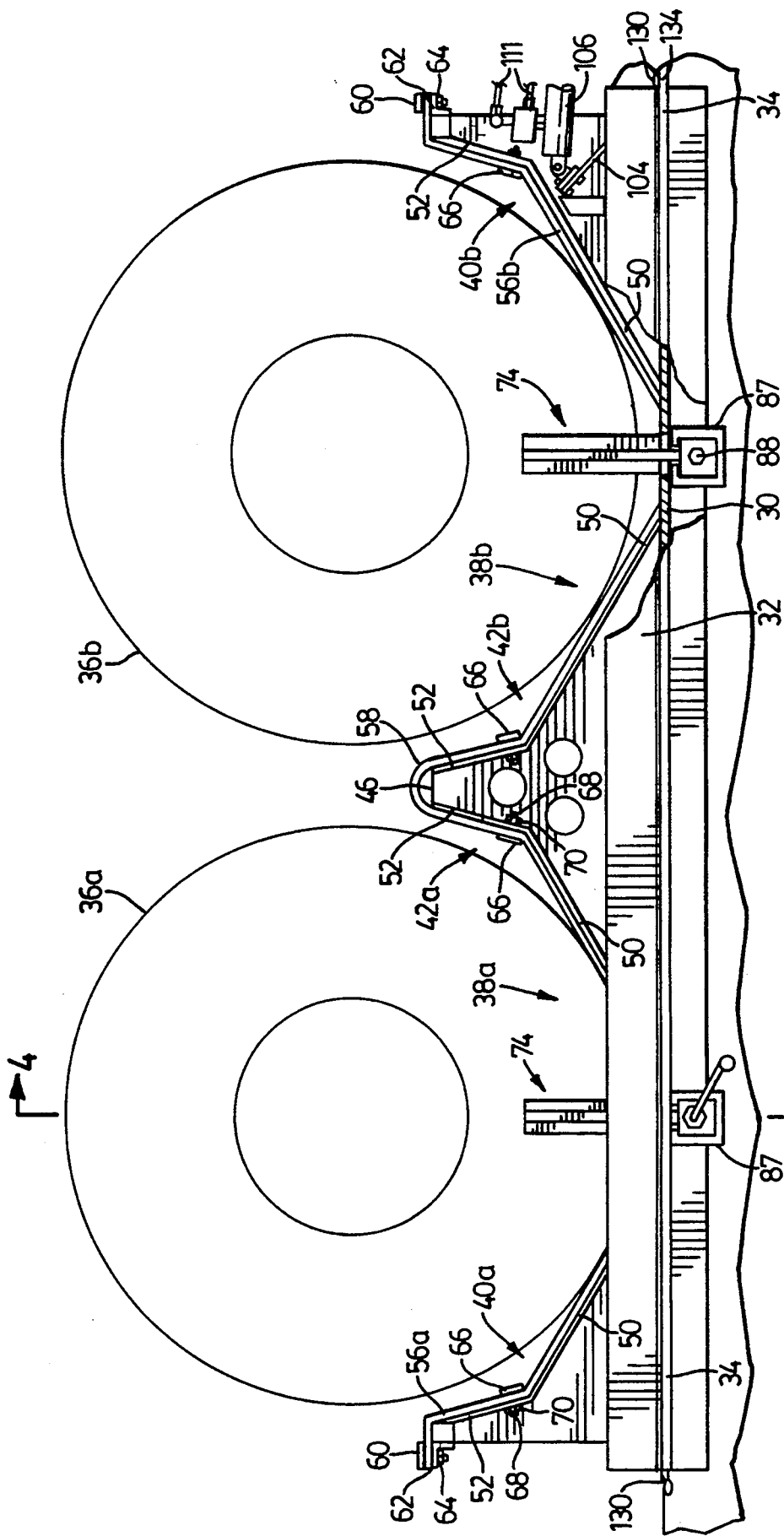
FIG. 3 is an enlarged side view of a portion of a trailer of FIG. 2, partly broken away.

As best shown in FIGS. 2 and 3, each ramp has a sloped surface, namely an inclined lower surface 50 and a more steeply upwardly inclined upper surface 52, meeting at an apex 54. The slopes of the surfaces of the ramps are chosen so that each bunk 38a, 38b holds its associated roll 36a, 36b off the floor pan of the trailer 14 (as best shown in FIGS. 2, 3).

More specifically, the shallower angle lower surface 50 of each ramp 40a, 42a, 40b, 42b is designed to hold all rolls expected to be carried, from the smallest to the largest, above the floor pan 30. Typically the smallest roll will be held so that its lowest part is about one inch above the floor pan 30, and yet the bottom of the largest roll to be carried will be only about four inches above the floor pan 30.

The steeper sloped upper surface 52 of each ramp is provided as a safety factor. Since the rolls 36a, 36b are typically not chained down (since chaining tends to damage the roll surfaces) and are held only by the ramps and by side bars to be described, the steeper surfaces 52 of the ramps help to prevent the rolls from shifting forwardly or rearwardly if unusually high forward or rearward decelerations or accelerations occur.

Each ramp 40a, 42a, 40b, 42b is surfaced with a sheet of heavy rubber 56a, 56b, 58. The end rubber sheets 56a, 56b are secured to the ramps at their top edges by being clamped between two metal plates 60, 62 (FIG. 3) bolted together by bolts 64. A single rubber sheet 58 extends over the triangular shaped central structure 46. Each rubber sheet 56a, 56b, 58 is pinned to its associated ramp by a metal bar 66 which extends substantially across the entire width of the ramps and is located on the upper sloped surface 52, just above the location where the two sloped surfaces 50, 52 meet. The metal bar 66 has studs 68 welded to it which pass through the metal forming the ramps 40a, 42a, 40b, 42b. Nuts 70 are secured to the studs 68 to hold the bars 66 in position. The location of the bars 66 just above the apex 54, and the fact that the bars 66 are thin with no bolt heads projecting from them, ensure that the rolls 36a, 36b will not contact the bars 66.

The rolls 36a, 36b are held against sideways movement across the bunks, and against telescoping movement, by two side locks 74, 76. As best shown in FIGS. 4, 5, each side lock has a T-shaped upright upper portion consisting of a laterally extending member 78, and a pressure member 80. The pressure member 80 is surfaced with a rubber sheet 82 (which can be glued thereto) to press against the sides of the rolls. The laterally extending member 78 is welded to a box-shaped member 83 having a threaded opening 84 extending laterally therethrough. The opening 84 receives a threaded screw shaft 86 rotatably mounted in housing 87 in the trailer frame and having a hexagonal end 88 projecting from the frame. A crank handle 90 can be applied over the end 88 to rotate the screw shaft 86, to move the side lock 74 or 76 laterally towards and away from the roll 36a or 36b. In FIG. 4 side lock 76 is shown moved into position against the side of the roll 36a, while side lock 74 is shown spaced away from the roll 36a. Thus, the rolls 36a, 36b can be lowered onto the ramps, the hoisting equipment disengaged, and the side locks 74, 76 can be moved tightly against the sides of the rolls to clamp them in position for transportation.

After the rolls 36a, 36b have been clamped in the bunks 38a, 38b, it is important to protect them against water, dirt and other external contaminants. Therefore each trailer includes a lid 100, 102 formed in the shape of a box having an open bottom. As shown in FIGS. 2 and 3, a triangular metal structure 104 is mounted to each side of the frame of trailer 14, projecting just above the sill 32, and a hydraulic cylinder (and piston) 106 is pivotally mounted at 108 to the metal structure 104. A piston rod 110 extends from cylinder 106 and has at its end a yoke 112 which is pivotally mounted at 114 (see also FIG. 6) to a channel 116 which is secured to the rear wall 118 of the lid 100. As indicated in FIGS. 2 and 6, two piston and cylinder mechanisms 106 are provided, one adjacent each side of the rear wall 118 lid.

In addition, two hinges 122 (FIG. 2; only one is shown) mounted at the ends of frame rails 124 of the trailer hingedly connect the lid 100 to the trailer 14. Thus, as the piston rods 110 are extended and retracted (using standard hydraulic hoses 111 and controls, not shown), the lid 100 will pivot between the closed position shown in dotted lines in FIG. 2, and the open position shown in full lines in FIG. 2.

When the lid 100 is in its open position, its rear wall 118 is oriented horizontally as shown in FIG. 2 and rests on a stand 126 (see also FIG. 7) extending upwardly from the tongue 26 between the two trailers 14, 16. A second stand 128 extending upwardly from the same tongue serves to support lid 102 of the second trailer 16 when that lid is lifted. To keep tongue 26 to a reasonable length, normally only one lid 100 or 102 can be opened fully at the same time.

When the lid 100 is closed, it is important that the seal between it and the remainder of trailer 14 be relatively weather tight, to prevent water and dirt from reaching the rolls 36a, 36b. Therefore a multi-part seal is provided. Firstly, the lip 32 extends between six and eight inches above the floor pan 30 of the trailer, and the side and end walls of the lid descend over the lid and rest on the horizontal ledge 34 extending outwardly around the lip. Secondly, a round or oval rubber seal 130 (FIG. 8) is fixed to the ledge 34, so that the bottom edges 132 of the lid press on and compress the seal 130, thereby improving the weather resistance of the connection. Thirdly, a rubber wiper seal 134 extends horizontally inwardly from the inside wall of the lid, around the entire periphery of the lid, and wipes against the outer surface of the lip 32 as the lid descends. The wiper seal 134 is secured to a wooden ledge 136 forming part of the inside wall of the lid. The multi-part seal shown prevents water and dirt under most circumstances from reaching interior of the trailer.

When the lid 100 is closed, it is latched in closed position by a latch mechanism 140 best shown in FIGS. 9 and 10. The latch mechanism 140 includes a hook 142 pivotally attached at 143 to piston rod 144 of a motor and cylinder 146 mounted at the front of trailer 14 (and at the rear of trailer 16). The hook 142 engages a stud 148 projecting from the lower edge of the front wall 150 of trailer 14 (or the rear wall of trailer 16).

The hook 142 is shown in latched position in FIG. 9 and is normally held in this position by a coil spring 152. When the piston rod 144 is moved upwardly, the hook 142 is moved above stud 148 and can then be pushed sideways as shown in FIG. 10, to disengage one end of the lid so that it can be raised. The arrangement shown is failsafe in that if the hydraulic pressure fails, the latch will be held closed by the spring 152.

Although the trailer assembly shown includes two trailers each with two bunks for two rolls, different configurations can be used. For example one trailer carrying more than two rolls can be provided. One advantage of the arrangement shown is that each trailer is not unduly long, and the lids of both trailers open toward each other, which is convenient for loading and removal of the coils.

While preferred embodiments of the invention have been described, it will be appreciated that various changes may be made in the arrangement, for portions and details of various parts of the preferred embodiment without departing from the scope of the invention as disclosed and defined in the appended claims.

I claim:

1. A wheeled road vehicle having a front and a rear and adapted for travel longitudinally along a path of travel and for carrying at least a pair of rolls of coiled material, each roll having a pair of ends, said vehicle having:

(a) a floor pan, (b) at least first and second bunks, each bunk comprising (i) two opposed inclined members, one of said inclined members sloping upwardly and forwardly from said floor pan and the other sloping upwardly and rearwardly from said floor pan to form a substantially V-shaped surface to support one of said rolls, said members being inclined at angles for maintaining the bottom of said one of said rolls above said floor pan, (ii) two side locks, one at each side of said bunk, for restraining said one of said rolls in said bunk against movement laterally of said path of travel, each side lock comprising a bar upstanding from said floor pan, a resilient pad on said bar, said pad having a substantially planar face oriented in a plane extending vertically and longitudinally, and mounting means mounting each said side lock for independent lateral movement towards and away from an end of said one of said rolls in said bunk such that said resilient pads can be selectively brought into contact with said ends of said one of said rolls, (iii) each of said mounting means being located substantially entirely beneath said floor pan, (d) a lid having a pair of side walls, a pair of end walls, and a top, said side walls and end walls extending substantially to said floor pan, (e) hinge means adjacent one of said end walls of said lid and mounting said lid at a hinge axis transverse to said path of travel for pivotal movement between a closed position in which said lid forms a tight seal with said floor pan to cover said pair of bunks and to isolate a pair of rolls in said bunks from the weather, and an open position in which one of said end walls of said lid is substantially horizontal and said side walls of said lid are spaced longitudinally from said rolls in said bunks to fully uncover all of said rolls including all of said ends thereof, so that said rolls can be placed in or removed from said bunks, and (f) piston and cylinder means within said lid adjacent one of said ends of said rolls for moving said lid between said open and closed positions.

2. The invention according to claim 1 and including stand means for supporting said lid when said lid is in said open position, said stand means comprising a pair of extending first bars spaced laterally apart and having upper ends, and a laterally extending bar connected to said upper ends.

3. The invention according to claim 1 and including sealing means associated with said floor pan and said lid for providing said tight seal, said sealing means including a peripheral vertical extending lip extending upwardly and extending around the perimeter of said floor pan and having an outside surface and an upper edge, and a substantially horizontal ledge extending outwardly from said outside surface of said lip below said upper edge and also extending around the perimeter of said floor pan, said side walls and end walls of said lid, when said lid is closed, extending over said outside surface of said lip and downwardly to a position adjacent said ledge, and a wiper flap having an inner free edge mounted on each of said lid side and end walls, said wiper flap extending inwardly towards said outside surface of said lip, and said free edge contacting said outside surface of said lip, when said lid is closed.

4. The invention according to claim 1 wherein said vehicle includes tongue means for connecting said vehicle to another vehicle, and an upright stand on said tongue means for supporting said lid when said lid is open.

5. The invention according to claim 1 wherein said floor pan has two lateral edges and each of said lid end walls has two sides, each of said end walls being adjacent an edge of said floor pan, said piston and cylinder means comprising two cylinder supports, one of said supports being connected to said floor pan and adjacent one of said floor pan edges, and two cylinders, one of said cylinders being pivotally mounted to one of said cylinder supports, and two cylinder rods, one cylinder rod extending from each cylinder and being connected to one of said end walls of said lid adjacent one of said sides of one of said end walls.

6. The invention according to claim 1 wherein in each of said bunks said opposed inclined members form with said floor pan an apex, said side locks being located adjacent said apex.

7. The invention according to claim 6 wherein each of said means mounting each of said side locks includes a threaded shaft extending laterally of said vehicle between a corresponding one of said opposed pairs of inclined members and below said floor pan, each side lock being mounted on one of said threaded shafts, said threaded shafts being aligned on a common axis and spaced laterally from each other, each shaft having an outer end and having first engagement means at each said outer end, and a removable handle having second engagement means thereon shaped to removably connect to said first engagement means of each shaft for turning said shafts so that said handle can be used to move one of said side locks of one of said bunks and then the other side lock of said one of said bunks towards or away from an end of a roll supported in said one of said bunks.

8. The invention according to claim 1 wherein each inclined member has a lower surface having a first slope and an upper surface connected to said lower surface and having a second slope which is more steeply inclined from horizontal than said first slope, said upper surface not being vertical, one inclined member of said first bunk being adjacent one inclined member of said second bunk, and resilient sheet means extending over each said one inclined member of said first and second bunks and extending the full width of each said one inclined member of said first and second bunks, the resilient sheet means extending over said one inclined member of said first bunk and extending as a continuous piece over said one inclined member of said second bunk, said upper and lower surfaces of each inclined member meeting at a vertex, each said inclined member further including bar means extending across said upper surface and being adjacent said vertex for retaining said sheet means on said inclined member without contacting a supported.

9. The invention according to claim 8 and including resilient sheet means extending over all of said inclined members.

10. The invention according to claim 1 wherein said vehicle is a trailer.

11. The invention according to claim 1 wherein said vehicle includes two trailers and a road propulsion tractor, one of said trailers being connected to said road propulsion tractor and the other of said trailers being connected to said one of said trailers.

12. A wheeled road vehicle having a front and a rear and adapted for travel longitudinally along a path of travel and for carrying at least a pair of rolls of coiled material, each roll having a pair of ends, said vehicle having:
(a) a floor pan,
(b) at least first and second bunks, each bunk comprising
  (i) two opposed inclined members, one of said inclined members sloping upwardly and forwardly from said floor pan and the other sloping upwardly and rearwardly from said floor pan to form a substantially V-shaped surface to support one of said rolls, said members being inclined at angles for maintaining the bottom of said one of said rolls above said floor pan,
  (ii) two side locks, one at each side of said bunk, for restraining said one of said rolls in said bunk against movement laterally of said path of travel, each side lock comprising a bar upstanding from said floor pan, a resilient pad on said bar, said pad having a substantially planar face oriented in a plane extending vertically and longitudinally, and mounting means mounting each said side lock for independent lateral movement towards and away from an end of said one of said roller in said bunk. such that said resilient pads can be selectively brought into contact with said ends of said one of said rolls,
  (iii) each of said mounting means being located substantially entirely beneath said floor pan,
(d) a cover having a pair of side walls extending substantially to said floor plan,
(e) means mounting said cover for movement between a closed position in which said cover forms a tight seal with said floor pan to cover said pair of bunks and to isolate a pair of rolls in said bunks from the weather, and an open position in which said side walls of said cover are spaced longitudinally from said rolls in said bunks to fully uncover all of said rolls including all of said ends thereof, so that said rolls can be laced in or removed from said bunks without said rolls being constructed by said cover.

* * * * *